(12) United States Patent
Altham

(10) Patent No.: US 6,351,100 B1
(45) Date of Patent: Feb. 26, 2002

(54) METHOD OF, AND CIRCUIT FOR, CONTROLLING THE DISCHARGE OF A BATTERY

(75) Inventor: David R. S. Altham, Southery (GB)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/710,828

(22) Filed: Nov. 13, 2000

(30) Foreign Application Priority Data

Nov. 11, 1999  (GB) ............................................. 9926609

(51) Int. Cl.[7] ................................................. H02J 7/00
(52) U.S. Cl. ...................... 320/135; 320/166; 307/149
(58) Field of Search ................................. 320/135, 136, 320/166; 323/209, 301, 288; 307/44, 149; 368/204

(56) References Cited

U.S. PATENT DOCUMENTS 4,616,167 A * 10/1986 Adler .......................... 320/166

* cited by examiner

Primary Examiner—Gregory J. Toatley, Jr.
(74) Attorney, Agent, or Firm—Jack D. Slobod

(57) ABSTRACT

A power supply circuit comprises a pre-regulator circuit (20) including an energy store (19). A control circuit (4) controls the current flow from a battery (18), creating an intermittent supply of current to the energy store (19) from which current is supplied to a voltage regulator (7) and application circuit (2, 4, 5, 6, 8 and 9). The energy store may be bypassed when desired, for example to maximise efficiency when the battery is approaching the end of its useful life.

10 Claims, 2 Drawing Sheets

METHOD OF, AND CIRCUIT FOR, CONTROLLING THE DISCHARGE OF A BATTERY

Figure 1:
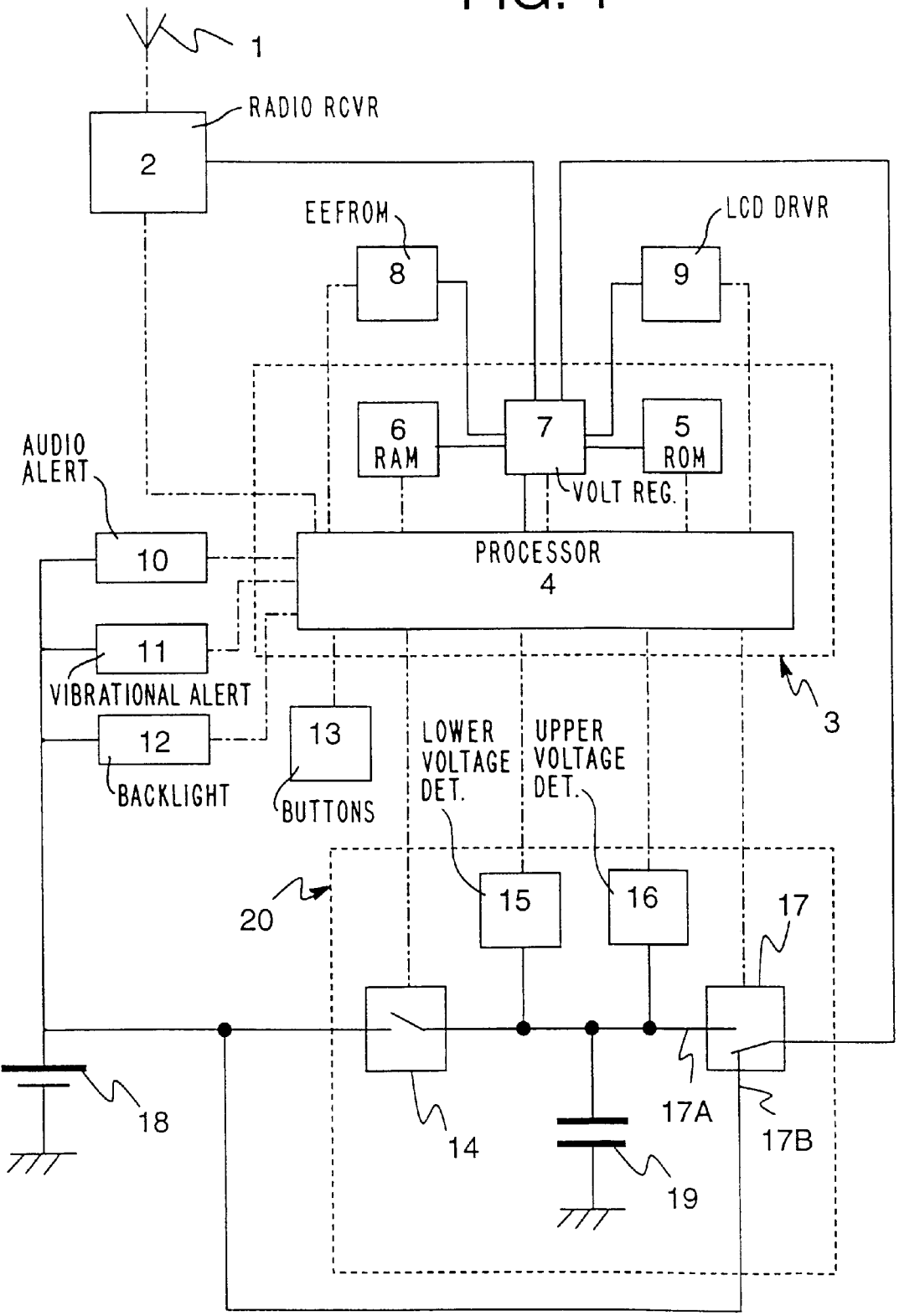

The present invention relates to a method of, and circuit for, controlling the discharge of a battery and to equipment operating in accordance with the method, and has particular, but not exclusive, application to portable communication devices, such as radio pagers, and telemetry modules.

For convenience of description the invention will be described with reference to a radio pager. Radio pager circuits are designed for low power consumption to enable a long battery life. In addition, radio pagers operate according to protocols such as CCIR Radiopaging Code No. 1 (also known as POCSAG) which include power saving features which enable the pager to switch off the majority of its circuits for most of the time. For example, the radio receiver in a pager will be active periodically to sample the radio channel for calls, during which time it will consume, for example, 5 mA, and for the remainder of the time it will be off. A radio pager also includes some circuits that consume a higher current, for example an audio alerter will consume about 100 mA and a vibrating alerter will consume about 30 mA, but these circuits are active only infrequently.

Developments in battery technology have resulted in batteries having an increased energy capacity, for example 2 AHr in some new AAA size batteries compared with 1 AHr in conventional AAA batteries. However, in order to derive the full benefit of these new battery technologies, the battery needs to be operated at a relatively high current level due to the chemical energy conversion processes which take place within the battery. Therefore, when such a battery is used in low current applications, the full benefit of the battery's enhanced energy capacity is not derived and the life of the battery is prematurely shortened.

An object of the present invention is to enhance battery life.

According to one aspect of the present invention there is provided a method of controlling the discharge of electrical energy from a battery into an application circuit, comprising:

a) transferring intermittently energy from the battery to an energy store, b) transferring energy from the energy store to a voltage regulator, and c) transferring energy from the voltage regulator to an application circuit, wherein the peak current flowing from the battery is larger than the peak current flowing into a voltage regulator.

In this way a relatively high pulsed current drawn from the battery is transformed into a relatively low current drawn by the voltage regulator and application circuit.

According to a second aspect of the present invention there is provided a circuit for controlling the discharge of electrical energy from a battery into an application circuit, comprising means for transmitting energy from the battery to an energy store, means for transferring energy from the energy store to a voltage regulator, and means for transferring energy from the voltage regulator to an application circuit; wherein the peak current drawn from the battery is larger than the peak current flowing into the voltage regulator.

In one embodiment of the invention, means are provided to transfer energy periodically from the battery to the energy store. In this way the energy store is maintained in a charged state in readiness for supplying current to the voltage regulator and application circuit.

In another embodiment of the invention, means are provided to enable the transfer of energy from the battery to the energy store when the voltage at the input to the voltage regulator falls below a predetermined level. In this way current is drawn from the battery only when the energy store is depleted by the current drawn by the voltage regulator and application circuit.

If desired, means are provided for measuring the time taken for the voltage at the input to the voltage regulator to change between two predetermined voltage levels and, in response to said time complying with a predetermined criterion, enabling the current drawn from the battery to bypass the energy store.

According to a third aspect of the present invention there is provided a circuit for controlling the discharge of electrical energy from a battery into an application circuit, comprising means for connection to the battery, first switching means coupled to the battery connection means to enable and disable flow of current from the battery, control means for controlling the operation of the first switching means such that the flow of current from the battery is intermittent, an energy store coupled to the first switching means to store energy delivered from the battery, a voltage regulator coupled to the energy store to draw current from the energy store, said current having a lower peak value than the peak value of the current flowing from the battery into the energy store, and means for coupling an output of the voltage regulator to an application circuit whereby current is drawn from the voltage regulator.

Figure 2A:
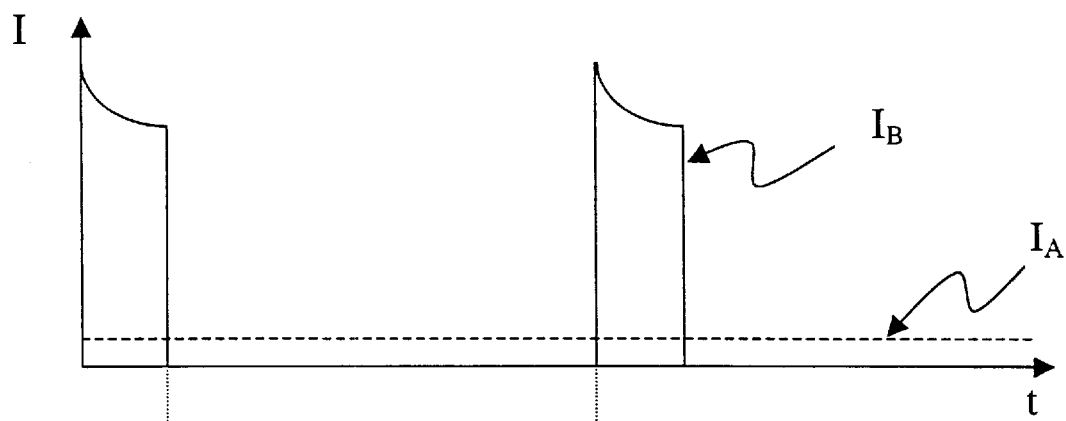
Figure 2B:
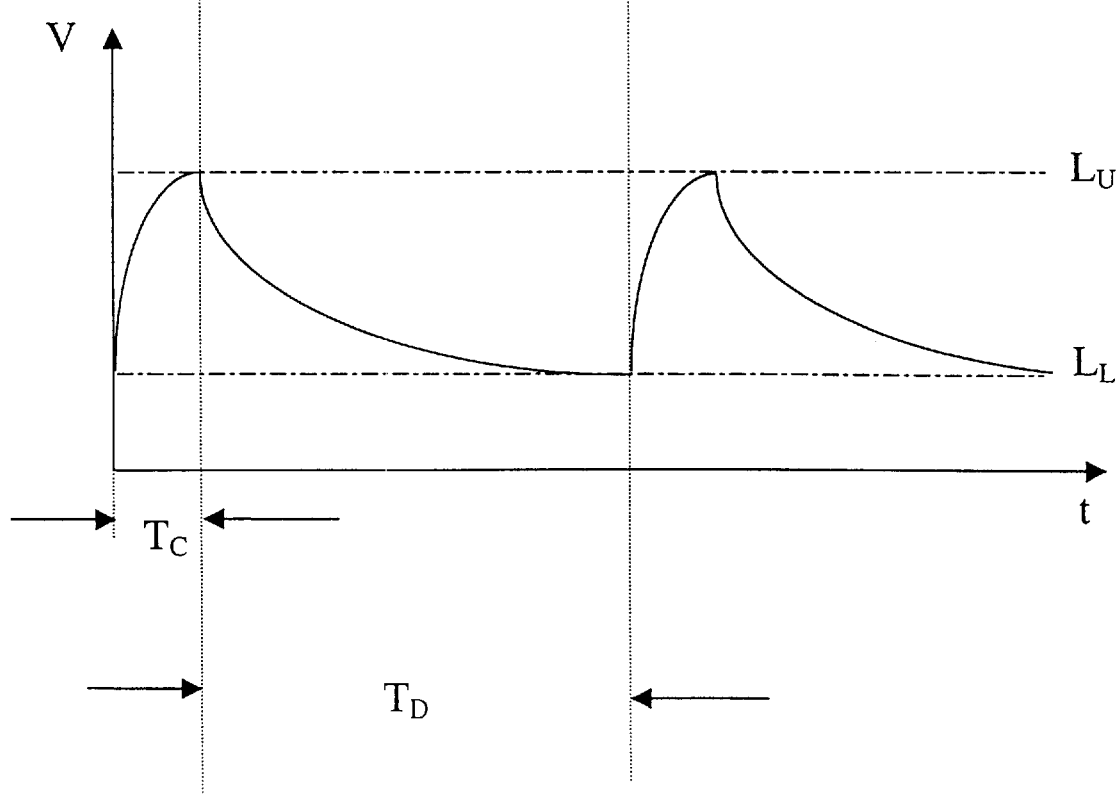

The present invention will now be described, by way of example, with reference to the accompanying drawings, wherein:

FIG. 1 is a block diagram illustrating an embodiment of a radio pager including a battery discharge control circuit made in accordance with the present invention, FIGS. 2A and 2B respectively illustrate graphically the current I and voltage V waveforms as a function of time t during the operation of charging and discharging the energy store.

MODES FOR CARRYING OUT THE INVENTION

In FIG. 1, for clarity, the interconnections which carry information signals or control signals are shown with a dot-dash line, and the interconnections which carry power are shown with a solid line.

Referring to FIG. 1, the radio pager includes an antenna 1 connected to a radio receiver 2 (for example the Philips UAA3500 integrated circuit) which is connected to a processor 4. The processor 4 is connected to a programme memory (ROM) 5, a volatile memory (RAM) 6, a voltage regulator 7, a message store (EEPROM) 8, an LCD display driver 9, an audio alert generator 10, a vibrating alerter 11, a backlight for the LCD display 12, buttons 13 for the user interface, a charging control switch 14, a lower voltage level detector 15 an upper voltage level detector 16 and a bypass changeover switch 17. Some of these circuit blocks are contained within an integrated circuit 3 such as the Philips PCD5007 microcontroller, viz the processor 4, the program memory 5, the volatile memory 6, and the voltage regulator 7. The voltage regulator 7 is a dc-to-dc converter which provides multiple output voltages, including a step up in voltage. In operation, the processor 4 controls whether the charging control switch 14 is open or closed, and also controls which of two inputs to the bypass changeover switch 17 are connected to the output of the bypass changeover switch 17.

The radio pager is powered by a battery 18. Some radio pager components are connected directly to the battery 18, viz the audio alert generator 10, the vibrating alerter 11, and the backlight 12. Other pager components are powered via connections to the voltage regulator 7, viz the radio receiver 2, the message store 8, the LCD display driver 9, the processor 4, the program memory 5, and the volatile memory 6.

In addition, the charging control switch 14 is connected to the battery 18. When the charging control switch 14 is in the closed position, as controlled by the processor 4, current may flow through the switch. The output of the charging control switch 14 is connected to the lower voltage level detector 15, the upper voltage level detector 16, an energy store 19 (represented in FIG. 1 by a capacitor), and one input 17A of the bypass changeover switch 17. The second input 17B of the bypass changeover switch 17 is connected to the battery 18. The output of the bypass changeover switch 17 is connected to an input of the voltage regulator 7.

The charging control switch 14 is shown diagrammatically in FIG. 1 as a simple mechanical switch, but in practice may be implemented using an electrical switching circuit, for example a Motorola MOSFET transistor MTD3302, which can enable power efficient switching. Similarly, the bypass changeover switch 17 may be implemented as an electrical switching circuit.

Conveniently, the grouping of the charging control switch 14, lower voltage level detector 15, upper voltage level detector 16, energy store 19 and the bypass changeover switch 17 may be defined to as a pre-regulator circuit 20. Although not shown in FIG. 1 for clarity, parts of the pre-regulator circuit are powered by the voltage regulator 7.

Referring to FIG. 2A, current $I_B$ is drawn from the battery in pulses of relatively high current whereas the current $I_A$ drawn from the voltage regulator 7 by the pager circuits 2, 4, 5, 6, 8, and 9, and hence from the energy store 19 by the voltage regulator 7, is relatively low and continuous. (In practice, the receiver in a radio pager will be active periodically, as described above, causing the current $I_A$ to vary. However, for clarity, the invention will be described assuming continuous operation of the radio pager, as is the case during reception of a message, in which case the current $I_A$ is substantially constant).

Referring to FIG. 2B, the voltage V across the energy store 19 increases rapidly during the period $T_C$ while current is drawn from the battery to charge the energy store, and then decreases relatively slowly during the period $T_D$ while current is drawn from the energy store by the voltage regulator and application circuit thereby discharging the energy store.

The operation of the pre-regulator circuit 20 will now be described with reference to FIGS. 1, 2A and 2B. Assume as an initial condition that the charging control switch 14 is closed, the energy store 19 is not charged, and the bypass changeover switch 17 is set to connect the energy store 19 to the voltage regulator 7. The energy store 19 will begin to charge from the battery 18. With a low resistance charging circuit the charging will be rapid and a relatively large current will flow, for example 100 mA. When the voltage across the energy store 19 is sufficient to drive the pager circuits 2, 3, 8 and 9, the pager circuits will draw current form the energy store 19. The current drawn by the pager circuits will be relatively small, for example 5 mA, because the pager circuits are optimised for low power consumption.

Charging of the energy store 19 continues until the upper voltage level detector 16 detects that the voltage across the energy store exceeds a predetermined upper voltage level $L_U$, in which case this will be indicated to the processor 4 and the processor will exert control to open the charging control switch 14, which action will terminate the charging process.

The pager circuits 2, 3, 8 and 9 will continue to operate after the charging has been terminated by drawing current from the energy store 19, thereby discharging the energy store.

As the pager circuits 2, 3, 8 and 9 draw current the voltage across the energy store will decrease relatively slowly. The lower voltage level detector 15 detects when the voltage falls below a predetermined lower voltage level $L_L$ and indicates this to the processor 4, and the processor will exert control to close the charging control switch 14, which action will re-start the charging process.

As shown in FIGS. 2A and 2B, the process of recharging and discharging repeats while the pager circuits are drawing current.

In a non-illustrated variant of the pre-regulator circuit 20, instead of the lower voltage level detector 15 initiating recharging of the energy store 19, the lower voltage level detector 15 may be omitted and the processor 4 may close the charging control switch 14 periodically.

In another non-illustrated variant of the pre-regulator circuit 20, instead of the upper voltage level detector 16 terminating recharging of the energy store 19, the upper voltage level detector 16 may be omitted and the processor 4 may open the charging control switch 14 periodically.

When the battery is approaching the end of its useful life its voltage decreases and its internal resistance increases. Consequently the time taken to recharge the energy store 19 increases. If desired, the processor 4 may detect this degradation in recharging time by monitoring the outputs from the upper and lower voltage level detectors 15 and 16 (or alternatively from two additional voltage level detectors, not illustrated) and, when the time taken to recharge the energy store 19 between two pre-determined levels (these levels may be different from the levels $L_U$ and $L_L$) complies with a pre-determined criterion, the processor 4 will exert control over the bypass changeover switch 17 such that the pager circuits 2, 3, 8 and 9 draw current directly from the battery, bypassing the energy store 19, thereby reverting to conventional operation of the battery. (Depending on the application circuit, the processor 4 may need to select the time at which the measurement of recharging time is made to ensure that the current drawn by the application circuit does not significantly affect the recharging time). If the bypass function is not required for a particular embodiment, the bypass changeover switch 17 may be omitted. Furthermore, as an alternative to bypassing the energy store 19, the processor 4 may maintain the charge control switch 14 in the closed position, in which case the bypass changeover switch 14 may be omitted.

In another non-illustrated variant of the pre-regulator circuit 20, the bypass changeover switch 17 may be used to bypass the energy store 19 when a traditional battery type is used to power the embodiment and if no benefit would derive from employing the energy store 19.

It will be apparent to skilled persons that alternative electronic circuit configurations may be used to implement the functionality required by the invention. For example, it is not essential to use a processor to exert control over the charge control switch 14 or the bypass changeover switch 17, and, for example, other configurations of energy store are possible. Also, for example, instead of implementing multiple voltage level detector circuits, a single analogue-to-digital converter could be used with the level detection being implemented in the processor. The degree of sophistication selected by a designer for an embodiment will be a compromise between cost, complexity and power efficiency.

Although the invention has been described with reference to radio pagers, it is equally applicable to other low power battery operated electrical equipment, such as cellular and cordless telephones and telemetry modules.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of low current power supplies and components thereof and which may be used instead of or in addition to features already described herein.

What is claimed is:

1. A method of controlling the discharge of electrical energy from a battery into an application circuit, comprising:
   a) transferring intermittently energy from the battery to an energy store;
   b) transferring energy from the energy store to a voltage regulator, and
   c) transferring energy from the voltage regulator to an application circuit; wherein the peak current flowing from the battery is larger than the peak current flowing into the voltage regulator.

2. A method as claimed in claim 1, characterised by enabling periodically the transfer of energy from the battery to the energy store.

3. A method as claimed in claim 1, characterised by detecting when the voltage at the input to the voltage regulator falls below a predetermined level, and in response to the voltage falling below the predetermined level, enabling the transfer of energy from the battery to the energy store.

4. A method as claimed in claim 1, 2, characterised by measuring the time taken for the voltage at the input to the voltage regulator to change between two predetermined voltage levels, and in response to said time complying with a predetermined criterion, enabling the current drawn from the battery to bypass the energy store.

5. A circuit for controlling the discharge of electrical energy from a battery into an application circuit, comprising means for transmitting energy form the battery to an energy store, means for transferring energy from the energy store to a voltage regulator, and means for transferring energy from the voltage regulator to an application circuit, wherein the peak current drawn from the battery is larger than the peak current flowing into the voltage regulator.

6. A circuit for controlling the discharge of electrical energy from a battery into an application circuit, comprising means for connection to the battery, first switching means coupled to the battery connection means to enable and disable flow of current from the battery, control means for controlling the operation of the first switching means such that the flow of current from the battery is intermittent, an energy store coupled to the first switching means to store energy delivered from the battery, a voltage regulator coupled to the energy store to draw current from the energy store, said current having a lower peak value than the peak value of the current flowing from the battery into the energy store, and means for coupling an output of the voltage regulator to an application circuit whereby current is drawn from the voltage regulator.

7. A circuit as claimed in claim 5, characterised in that the intermittent current flow is periodic.

8. A circuit as claimed in claim 5, characterised by voltage detection means coupled to monitor the input of the voltage regulator, the output of said voltage detection means being connected to the control means whereby the control means determines whether the monitored voltage is above or below a predetermined lower level and above or below a predetermined upper level, in response to which the control means operates the first switching means to enable the transfer of energy from the battery to the energy store when said monitored voltage falls below the predetermined lower level, and operates the first switching means to disable the transfer of energy from the battery to the energy store when said monitored voltage increases above the predetermined upper level.

9. A circuit as claimed in claim 5, characterised by changeover second switching means having a first input coupled to the output of the energy store, a second input coupled to the battery, and an output connected to the input of the voltage regulator; and control means for controlling the operation of the changeover second switching means, said control means having means to measure the time taken for the voltage at the input of the voltage regulator to change between two predetermined voltage levels, and, in response to said time complying with a predetermined criterion, said control means operating the changeover second switching means to switch its output from its first input to its second input.

10. Apparatus having an application circuit powered by a battery, said apparatus being characterised by having a means of controlling the discharge of electrical energy from the battery operating in accordance with claim 1.

* * * * *